March 19, 1929.  E. F. FISHER  1,705,812
HEATING APPARATUS
Filed Jan. 27, 1927   2 Sheets-Sheet 1
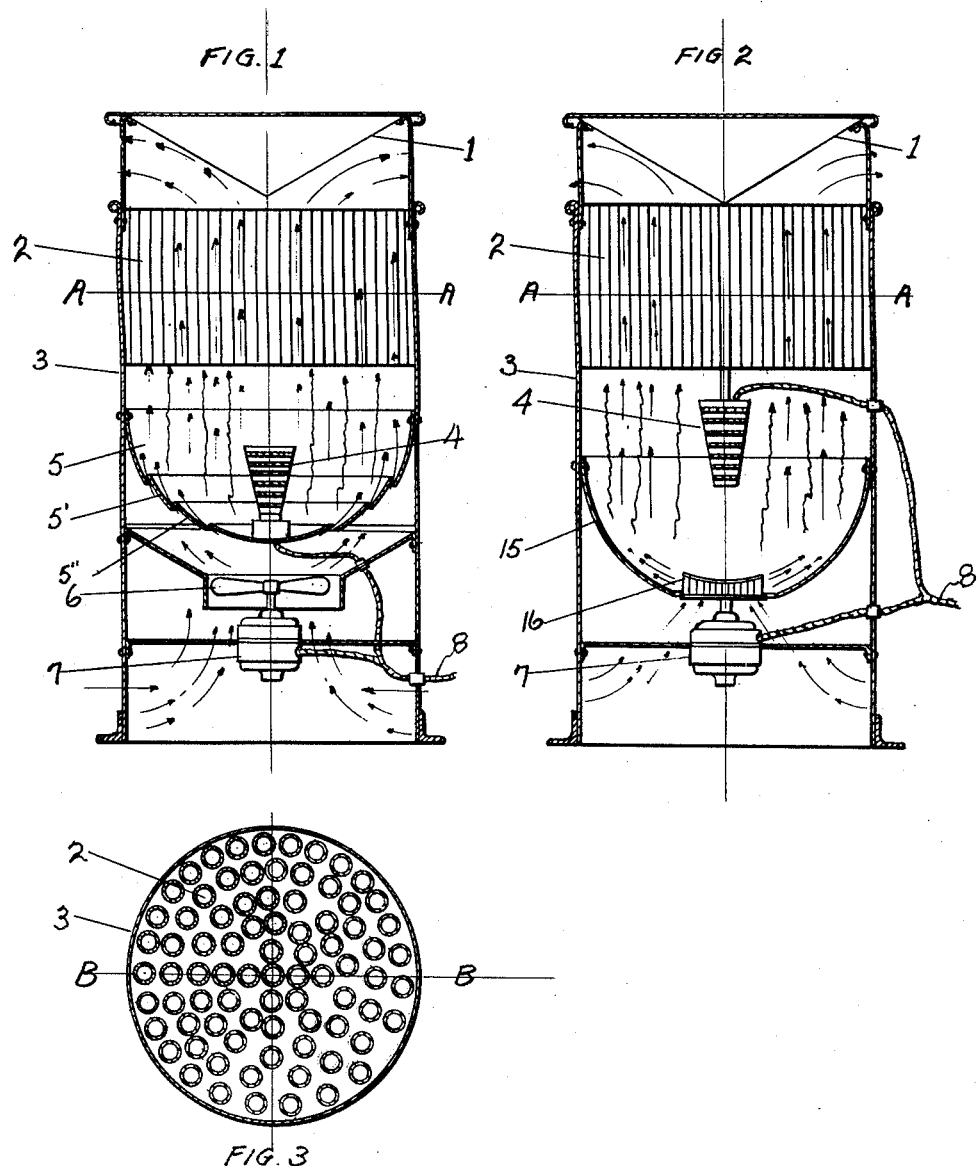
WITNESSES
INVENTOR
Ernest F. Fisher

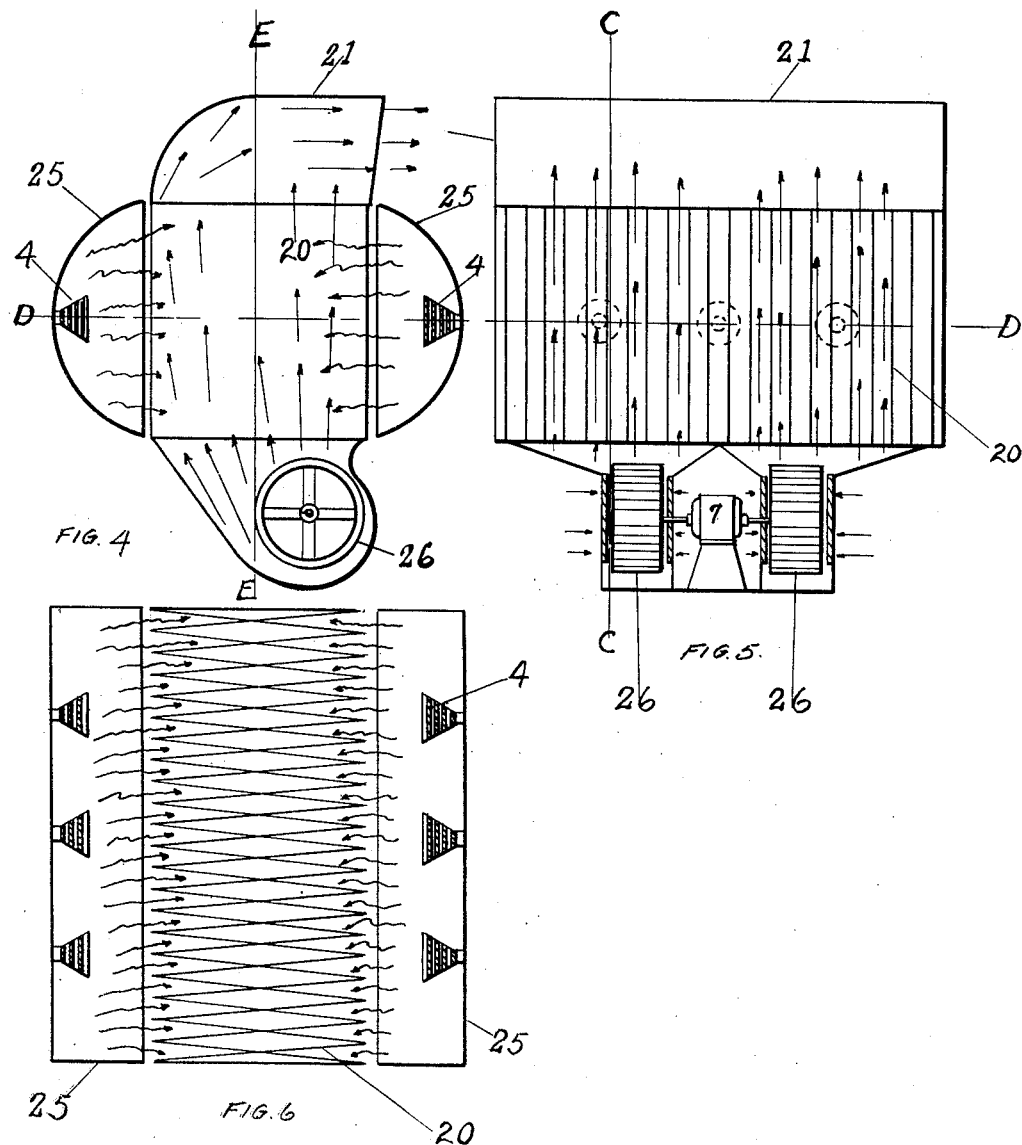

Patented Mar. 19, 1929.

1,705,812

UNITED STATES PATENT OFFICE.

ERNEST F. FISHER, OF ST. LOUIS, MISSOURI, ASSIGNOR TO FANAIRE HEATER COMPANY, OF ST. LOUIS, MISSOURI, A CORPORATION OF MISSOURI.

HEATING APPARATUS.

Application filed January 27, 1927. Serial No. 164,089.

This invention relates to heating apparatus of the type that are used to heat air.

One object of the invention is to provide a compact and highly efficient air heater, that is inexpensive to construct and inexpensive to operate.

Another object is to provide an electrically-operating heating apparatus which is efficient enough to enable it to be used in competition with conventional heating apparatus of the kind that are operated by gas, solid fuel, or liquid fuel.

And still another object of my invention is to provide an electrically-operated air heater, which, in addition to being compact, efficient and inexpensive, is of attractive and ornamental appearance, thereby enabling it to be used in the same way and for the same purposes that conventional gas heaters and heating stoves of the cabinet type are now used. Other objects and desirable features of my invention will be hereinafter pointed out.

To this end I have devised a heating apparatus that comprises a heat absorber capable of absorbing luminous and non-luminous ether waves, a heating device, a reflector combined with said heating device and heat absorber in such a way that it will intercept and gather heat waves emanating from said heating device and project said heat waves onto the heat absorber, and a part that forms an air passageway through which air circulates in contact with the heat absorber, abstracts heat from the same and then escapes into the room or compartment in which the apparatus is located or flows through a conduit leading to a space which it is desired to heat.

The heating device may consist of any means that will emit heat waves, such as a gas burner or an electrically-operated heating element; the reflector may consist of any member that will intercept or gather heat waves emanating from the heating device and project the heat waves onto the heat absorber; the heat absorber may consist of any element, device or structure that is capable of freely absorbing heat waves, and thereafter impart said heat waves by conduction to air currents, and any suitable means may be used to cause air to absorb heat from the heat absorber and then flow into the compartment or space which it is desired to heat. I prefer to use an electrically-operated heating element to constitute the heating device of the apparatus and arrange said heating device in the focal point of a substantially concavo-convex-shaped polished reflector which is disposed in such relationship with the heat absorber that the heat waves from the heating device which strike the reflector will be projected onto the heat absorber. In the preferred form of my invention herein illustrated the heat absorber is of such construction that it will effectively block off the passage of the heat waves from the reflector, but will permit air to flow through said heat absorber, thereby causing the air to be heated by conduction as it travels through the heat absorber. If desired, the surface or surfaces of the heat absorber with which the air contacts can be coated with a dead black paint, so as to more effectively absorb the heat waves from the heating device.

Figure 1 of the drawings is a vertical transverse sectional view of a heating apparatus constructed in accordance with my invention, taken on the section line B—B of Figure 3.

Figure 2 is a vertical transverse sectional view of a heating apparatus similar in general design to the one illustrated in Figure 1, but provided with a different kind of reflector and a different kind of fan for causing air to circulate over the heat absorber.

Figure 3 is a horizontal sectional view through the heat absorber, taken on the line A—A of Figures 1 or 2.

Figure 4 is a vertical transverse sectional view, illustrating another form of my invention, taken on the line C—C of Figure 5.

Figure 5 is a vertical longitudinal sectional view of the apparatus shown in Figure 4, taken on the line E—E of Figure 4; and Figure 6 is a horizontal longitudinal sectional view, taken on the line D—D of Figures 4 or 5.

In the form of my invention illustrated in Figure 1, 4 designates a heating device, preferably an electrically-operated heating element, that is arranged at the focal point of a curved reflector formed either by a concavo-convex-shaped shell, or by a plurality of members 5, 5′ and 5″ that co-operate with each other to form a concavo-convex-shaped reflector that surrounds the heating device 4. The said reflector is arranged horizontally with its open end presented upwardly inside of a cylindrical casing 3, that constitutes a passageway through which air circulates. In a heating apparatus of relatively large capacity, as herein shown, a fan 6 is preferably arranged below said reflector so as to draw air into the lower end of the casing 3 and force said air upwardly through slots or spaces between the members 5, 5′ and 5″ that constitute the reflector which is associated with the heating device 4, the fan 6 being driven by an electric motor 7 to which electric current is supplied by a wire 8 provided with a branch that leads to the heating device 4.

A heat absorber 2 is arranged in the casing 3 at a point above the reflector and heating device, as shown in Figure 1. Said heat absorber may consist of any element, device or structure that is capable of freely absorbing heat waves and capable of freely conducting the heat absorbed to air that contacts with the heat absorber. In the apparatus shown in Figure 1 the heat absorber 2 is composed of a plurality of vertically-disposed, open-ended tubes that are arranged inside of the casing 3 in such a way as to form a tube bank up through which air will circulate when the apparatus is in operation. If desired, said tubes can be coated with a dead black paint, so as to more effectively absorb the heat which is projected onto said tubes from the reflector associated with the heating device 4. The upper end of the casing 3 is closed by a cap or cover and air outlets are formed in the side wall of said casing at a point above the heat absorber 2, so as to provide for the escape of the air which has absorbed heat from the heat absorber. An inverted cone-shaped baffle or diffuser 1 is preferably arranged in the upper portion of the casing 3, as shown in Figure 1, so as to insure the heated air flowing radially through the air outlets at the upper end of the casing.

When the apparatus is in operation, heat waves emanating from the heating device 4 will be intercepted or gathered by the reflector that surrounds the heating device and projected upwardly by said reflector onto the heat absorber 2. Consequently, the air which the fan 6 forces upwardly through the casing 3, as indicated by the arrows in Figure 1, will abstract or absorb heat from the heat absorber 2, thus causing heated air to be discharged into the room or compartment in which the apparatus is located. Obviously, the air heated by the apparatus can be discharged into a conduit or conduits and conducted to one or more rooms or spaces located at a distant point which it is desired to heat with hot air.

A heating apparatus of the construction above described is exceptionally efficient, as all of the heat waves emitted by the heating device 4 will be absorbed by the heat absorber 2, and then transferred by conduction to the current of air which circulates over or through the heat absorber, and then passes into the compartment or space which it is desired to heat. The apparatus is inexpensive to build, and operate, and even when it is equipped with an electrically-operated heating device, it can compete successfully with conventional air heaters of the kind that are operated by gas, solid fuel or liquid fuel, due to the fact that practically all of the luminous and non-luminous rays from the heating device 4 are gathered by the reflector and projected onto a medium, to wit,—the heat absorber 2, which is of such a character that it is capable of freely absorbing heat waves and freely conducting heat to an air current that circulates in contact with same. In addition to having the desirable characteristics above pointed out, my improved apparatus is compact, and it is of neat and ornamental appearance, thereby enabling it to be used in a room in the same way and for the same purpose that conventional gas heaters and heating stoves of the cabinet type are now used.

In Figure 2 of the drawings I have illustrated another heating apparatus embodying my invention, that is similar in general design and in principle of operation to the apparatus shown in Figure 1, except that it is equipped with a reflector formed by a solid concavo-convex-shaped shell 15 having an opening at the center of same through which air is admitted to a fan that is arranged on the inside of the reflector. When the apparatus is in use the heat waves from the heating device 4 either pass directly upward onto the heat absorber 2, or strike the reflector 5 and are thence projected upwardly by said reflector onto the heat absorber, the current of air that is forced upwardly through the casing 3 by the fan 16 becoming highly heated by conduction while traveling through the casing to the air outlets at the upper end of the casing.

In Figures 4, 5 and 6 I have illustrated still another form of my invention, wherein the casing of the apparatus is substantially oblong-shaped in general outline and is arranged horizontally, said casing being provided at its lower end with air inlets through which currents of air are forced upwardly by a plurality of fans 26, and being provided at its upper end with an air outlet over which a diffuser or baffle 21 extends so as to cause the heated air to be projected into the room in which the apparatus is located, or into one or more conduits that lead to remote points. The heat absorber 20 of the apparatus is formed by two deeply corrugated plates arranged inside of the casing of the apparatus in such a manner as to form a group of substantially diamond-shaped tubes up through which air circulates, as indicated by the arrows in Figure 4. The front and rear sides of the casing are open and are arranged in alignment with two curved reflectors 25, each of which is provided with a plurality of electrically-operated heating devices 4, which are arranged in such relation with said reflectors that heat waves emanating from said heating devices will strike against the polished inner surfaces of the reflectors and be projected by said reflectors onto the corrugated plates that constitute the heat absorber 20 of the apparatus.

Having thus described my invention, what I claim as new and desire to secure by Letters Patent is:

1. A heating apparatus, comprising a part that forms a passageway through which air circulates, a heat absorber arranged in position to be acted upon by the air circulating through said passageway, a heating device, and a reflector for collecting or gathering together heat waves emanating from said device and projecting said heat waves onto the heat absorber.

2. A heating apparatus, comprising a casing, a heating device, a heat absorber and a concavo-convex-shaped reflector combined in such a way that the heating device is arranged in the focal point of the reflector, whereby a large portion of the heat waves emanating from said heating device will be gathered by the reflector and projected onto the heat absorber, and means for causing air to contact with said heat absorber and abstract heat from the same.

3. A heating apparatus, comprising a part that forms an air passageway, a fan for causing air to circulate through said passageway, a heat absorber arranged in said passageway so as to be acted upon by said circulating air and constructed so that it is capable of freely absorbing heat and transferring the heat by conduction to said air, an electrically-operated heating device, and a reflector arranged in such relationship with said heating device and absorber as to cause the major portion of the heat waves from the heating device to be projected onto said heat absorber.

4. A heating apparatus, comprising a casing provided with an air inlet and air discharge, a fan for producing a circulation of air through said casing, an electrically-operated heating device arranged inside of said casing, a heat absorber arranged inside of said casing out of physical contact with said heating device and constructed so as to effectively absorb thermal radiations but permit the passage of air through the same, and a reflector combined with said heating device and absorber for gathering heat waves from said device and projecting said waves onto said heat absorber.

5. A heating apparatus, comprising a casing provided with an air inlet and air discharge, an electrically-operated heating device in said casing, a heat absorber arranged inside of the casing out of physical contact with said heating device and disposed so that the air circulating through the casing will pass through said heat absorber before being expelled from the casing, a reflector for gathering heat waves from said heating device and projecting said heat waves onto said heat absorber, said reflector having an air opening, and a fan for inducing a circulation of air through the reflector and heat absorber.

ERNEST F. FISHER.